March 7, 1950     E. J. STUKENBORG     2,499,795
TOP BAR SPECTACLE MOUNTING
Filed Aug. 11, 1948
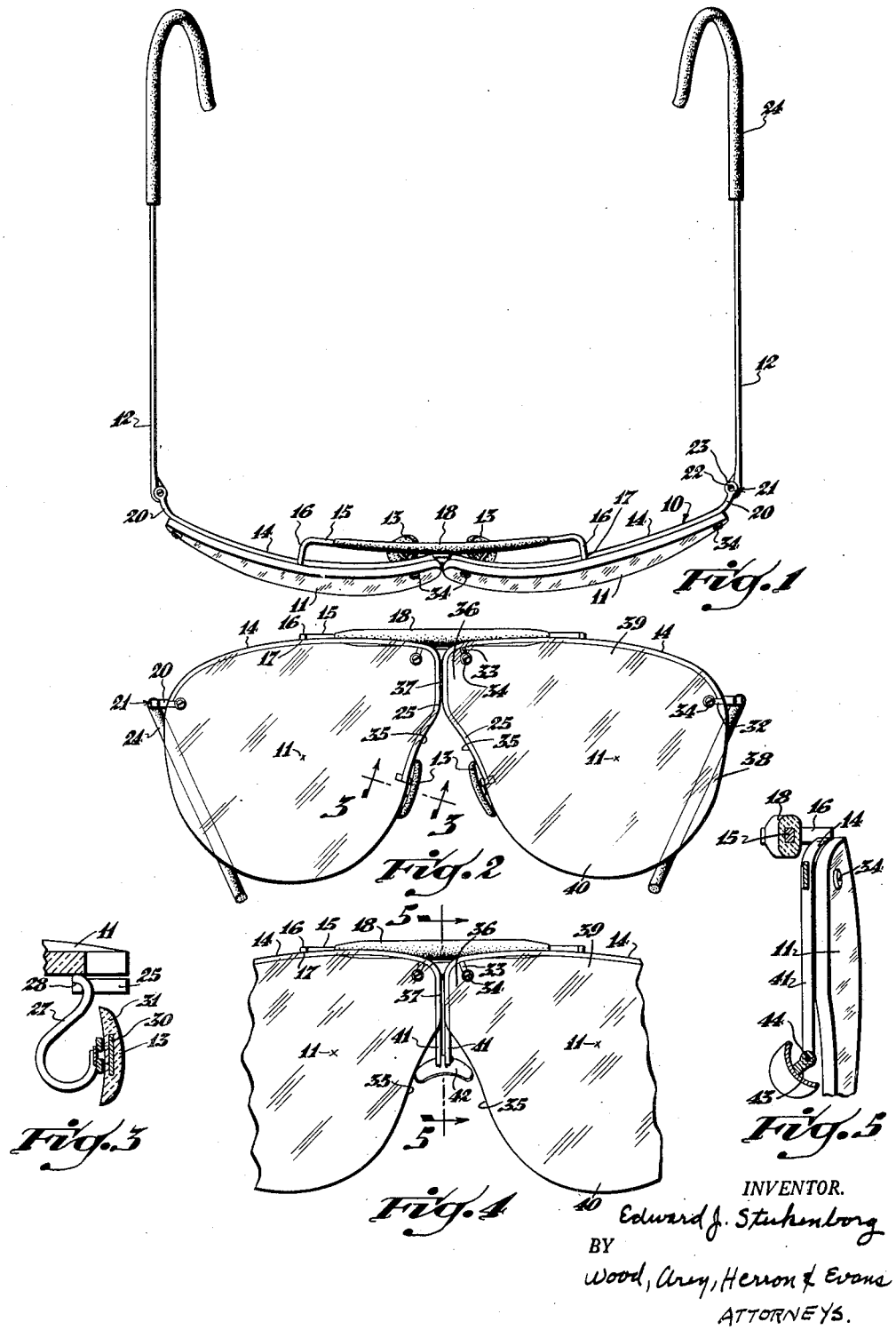
INVENTOR.
Edward J. Stukenborg
BY
Wood, Arey, Herron & Evans
ATTORNEYS.

Patented Mar. 7, 1950

2,499,795

UNITED STATES PATENT OFFICE 2,499,795

TOP BAR SPECTACLE MOUNTING

Edward J. Stukenborg, Cincinnati, Ohio

Application August 11, 1948, Serial No. 43,691

2 Claims. (Cl. 88—41)

This invention relates to eyeglasses with particular reference to improvements in the lenses and mountings, to provide a wider than normal field of vision and to protect the eyes from foreign matter. The improvements are intended to be embodied either in prescription eyeglasses or in glasses having planolenses, which may be tinted or polarized for sport wear.

It is well known that persons with defective vision find, that although necessary, glasses are a definite handicap in certain activities by reason on visual obstruction presented by the rims and other portions of the frame. While such obstructions are not particularly serious as applied to reading and other normal usage, they become quite annoying and detract noticeably from visual efficiency when the wearer is engaged in specialized lines of activity such as shooting, golf, tennis and outdoor sports generally. The problem is more serious when the wearer is engaged in a line of work which requires clear and unobstructed vision in all directions, such as in the practice of medicine and surgery, driving, art work and other pursuits. In all of these activities it is necessary for the individual to be able to glance quickly in various directions and see clearly without turning the head.

Briefly, it is the concept of the invention to provide an ophthalmic mounting having lens hangers disposed well above the field of vision, supported on nose pads in such position that all parts of the mounting structure are invisible to the wearer, combined with lenses which conform closely to the facial contours so that the lenses cover the entire field of vision without visible obstruction and serve also to protect the eyes from the entry of foreign matter.

As applied to shooting, the present improved structure permits the wearer to glance upwardly and towards the sides to sight the target quickly without turning the head, since the lenses are shaped to cover all angles which the eyes can reach naturally. As worn by a surgeon in performing an operation, the wide angle lenses provide the necessary clear and unobstructed view downwardly and toward opposite sides. Also, it sometimes happens during operations, that liquids spurt and reach the inner surfaces of the lenses of ordinary glasses, causing critical time losses. By reasons of the contour of the improved lenses, which closely embrace the contour of the face, such accidents are prevented.

It is a principal object of the invention to provide an eyeglass structure which offers a wide and unobstructed field of vision such that the benefits of corrective lenses are achieved with substantially none of the objectionable features commonly associated with eyeglasses so that the visual efficiency of the wearer is substantially equal to that of a person with normal vision.

A further object has been to provide a mounting or frame of this nature including a nose rest which is invisible to the wearer and which may be adjusted readily to the facial requirements of various individuals so as to maintain the peripheral edges of the lenses, particularly in the nasal area, almost in contact with the face, for maximum efficiency and protection, without discomfort to the wearer and to prevent dust and dirt from settling on inner surface of the lenses.

A further object has been to provide a mounting which is exceptionally light in weight arranged to provide a sturdy support for relatively large lenses which are configurated to follow closely the facial contour at the bridge of the nose to provide a maximum of coverage with a minimum of weight.

Further objects and salient features of the invention will be more fully disclosed in the detailed description with reference to the accompanying drawings, disclosing a preferred embodiment of the invention so that those skilled in the art will comprehend the various modifications to which the invention is susceptible.

In the drawings:

Figure 1 is a top plan view illustrating a pair of spectacles constructed in accordance with the present invention.

Figure 2 is a front elevation further illustrating the structural details of the organization.

Figure 3 is an enlarged sectional view taken on line 3—3, Figure 2 detailing the mounting arrangement of one of the nose pads relative to the mounting.

Figure 4 is a fragmentary front elevation similar to Figure 2, illustrating a mounting construction substantially the same as the structure illustrated in Figure 2, but showing a modified form of nose support for the mounting.

Figure 5 is an enlarged sectional view taken on line 5—5, Figure 4, further detailing the construction disclosed in Figure 4.

Referring to Figures 1 and 2, the mounting structure is indicated generally at 10 and provides a mounting for a pair of lenses 11—11. The mounting 10 includes a pair of temple pieces 12—12 and a pair of nose pads 13—13. Described in detail, the mounting constitutes a pair of hangers 14—14, each conforming to the contour of the lens along the upper edge and nasal portion of the lens. The respective hangers 14—14 are joined together by means of a connecting bar or bridge member 15, having its opposite ends bent at right angles to provide arms or struts 16—16 which are joined by soldering or brazing as at 17 to the respective hangers 14. The bar 15 preferably includes a covering 18 formed of an appropriate non-metallic material such as plastic to contact the forehead of the wearer (Figure 5).

The extended opposite ends of the respective hangers are curved rearwardly as at 20—20 to provide a hinge connection 21 to the respective temple pieces 12. The hinge connection is formed preferably by means of a screw 22 passing through a bifurcated eye 23 formed at the end of the curved portion 20. The rearward portions of the respective temple pieces 12 are looped as at 24 to embrace the ears of the wearer in the usual manner.

The inner portion of each hanger 14 includes a downwardly depending tracer arm 25 which follows closely the contour of the lens as hereinafter described. Upon the lower end of each arm 25 is mounted a nose pad 13 which is joined to the tracer arm 25 by means of a looped arm 27 (Figure 3). The end of the arm 27 is joined by soldering or by brazing as at 28 to the end of tracer arm 25. The construction of the nose pad 13 follows the usual construction and in general, constitutes a metal core member 30 joined to the arm 27, with a non-metallic covering 31 adapted to rest against the bridge of the nose. The arm 27 is formed from a ductile metal so that the pads 13 may be adjusted relative to each other by means of pliers in the customary fashion to provide individual fitting.

The lenses are disposed to the outside of mounting 10 so that the mounting lies between the lenses and the wearer. Each lens is secured at two points to the respective hangers 14—14. For this purpose each hanger includes a pair of ears 32 and 33. Ear 32 is located at the outer end of hanger 14, while ear 33 is located at the inner end of the hanger 14 directly above the nose pad 13. The lenses are secured to the respective ears by means of screws 34 passing through the lenses and screw-threaded into the ears. It will be noted that the ears 33 and 34 are disposed well above the normal field of vision so that they offer no obstruction and are invisible to the wearer.

From the foregoing it will be observed that the mounting assembly 10 constitutes a stabilized unit to provide a rugged support for the lenses 11—11. The mounting assembly is securely positioned on the wearer's face by the temple and nose pieces and the connecting bar 15 stabilizes the mounting by contact with the forehead of the wearer so that the mounting positions lies accurately with respect to the eyes and cannot be dislodged or displaced accidentally.

In order to further increase the field of vision, to eliminate obstructions and to offer maximum protection against the entry of foreign matter, the lenses are configurated to follow closely the contour of the face. For this purpose, each lens includes a complementary curved recess indicated at 35 in Figure 2. These recesses mutually define an opening adapted to fit closely about the bridge of the nose and provide also a lense area extending above the nose as at 36 to increase substantially the range of visibility. It will be noted that the adjoining edges of the lenses at this point are almost in contact as indicated at 37. The opposite end portion 38 of each lens extends beyond the line of vision and the upper and lower portions 39 and 40 likewise extend beyond the upper and lower limits. Thus, substantially the entire field of vision is covered by the lenses so that the wearer may glance about freely without turning the head to clear frame obstructions. The adjoining extensions 36—36, which meet at the center line 37, create the effect of a single uninterrupted lens, providing maximum visibility and freedom from obstruction.

As previously, noted tracer arms 25—25 are shaped to follow the recessed contour of the lenses so as to offer no interference with the proper fitting of the assembly. As shown in Figures 1 and 3, the nose pads 13 extend a substantial distance rearwardly from the inner surface of the lenses 11—11 and are invisible to the wearer. By virtue of this arrangement, the nose pads may be adjusted so that the weight of the glasses is supported by the nose pads while at the same time the contoured recesses 35—35 may be brought almost into contact with the bridge of the nose. This provides maximum visibility and eye protection without discomfort of having the edges of the lenses in actual bearing contact with the nose.

The mounting structure disclosed in Figure 4 is in all respects a duplicate of that illustrated in Figures 1 and 2 except that a modified form of nose rest is utilized. This structure is designed for individuals who, by reason of facial characteristics, require a support directly upon the bridge of the nose instead of nose pads which embrace the opposite sides of the bridge of the nose as above disclosed. For this purpose, the adjacent inner ends of the hangers 14 terminate in a pair of vertically depending arms 41—41, the lower ends of which provide for mounting a central nose rest 42. In the present instance, the lenses are recessed in the same manner as above described and the nose pad 42 is located rearwardly of the lenses so that the recessed edges 35—35 closely follow the contour of the bridge of the nose. The nose pad 42 is invisible to the wearer because it is away from the angle of vision.

As detailed in Figure 5, the rest 42 is curved transversely and longitudinally as to conform to and fit comfortably upon the nose bridge. Nose piece 42 includes a mounting lug 43 disposed between the vertical arms 41—41 and pivotally connected to the arms by means of a pivot pin 44 passing through the arms and the lug 43. This permits the nose rest 42 to assume a position best suited to the comfort of the individual. The mounting includes a connecting bar 15 and temple pieces 12—12 and provides substantially the same range of vision, freedom from obstruction and eye protection as pointed out above.

Having described my invention, I claim:

1. A pair of spectacles, comprising, paired lenses residing in contiguous edgewise relation over a substantial distance downwardly from the top contour edges of the lenses in the nasal portions thereof, each lens having a contour edge diverging in temporal direction from the lower portion of the line along which the lenses are contiguous, lens hanger means extending along the top contour edges of the lenses at the rear thereof, said lens hanger means having lens mountings associating the lenses therewith in temporal and nasal areas of the lenses, the said lens mountings which are in the nasal areas of the lenses being located near the top contour edges of the lenses adjacent the line along which the lenses are contiguous so as to be out of the field of view, relatively long arms associated with said lens hanger means, coursing along the contiguous edges of the lenses in the nasal area, and then diverging to follow approximately the diverging contour edges of the lenses, and nose pads adjustably mounted at the lower ends of the said arms in such manner that the points of attachment of the nose pads are below a line drawn through the geometric centers of the lenses.

2. A pair of spectacles, comprising, paired lenses residing in contiguous edgewise relation over a substantial distance downwardly from the top contour edges of the lenses in the nasal portions thereof, each lens having a contour edge diverging in temporal direction from the lower portion of the line along which the lenses are contiguous, lens hanger means extending along the top contour edges of the lenses at the rear thereof, said lens hanger means having lens mountings associating the lenses therewith in temporal and nasal areas of the lenses, the said lens mountings which are in the nasal areas of the lenses being located near the top contour edges of the lenses adjacent the line along which the lenses are contiguous so as to be out of the field of view, relatively long arms associated with said lens hanger means, coursing along the contiguous edges of the lenses in the nasal area, and then diverging to follow approximately the diverging contour edges of the lenses, nose pads adjustably mounted at the lower ends of the said arms in such manner that the points of attachment of the nose pads are below a line drawn through the geometric centers of the lenses, and a connecting bar extending along the lens hanger means across the contiguous portions of the lenses and having its respective opposite ends secured to the lens hanger means to rigidify the spectacles and constitute a brow support therefor.

EDWARD J. STUKENBORG.

REFERENCES CITED

The following references are of record in the file of this patent:

UNITED STATES PATENTS

| Number | Name | Date |
|---|---|---|
| 936,987 | Cook | Oct. 12, 1909 |
| 1,972,479 | Ferris | Sept. 4, 1934 |
| 1,984,541 | Nerney | Dec. 18, 1934 |
| 2,176,590 | Kirk et al. | Oct. 17, 1939 |
| 2,245,594 | Kimmel | June 17, 1941 |

FOREIGN PATENTS

| Number | Country | Date |
|---|---|---|
| 127,545 | Great Britain | June 15, 1919 |

OTHER REFERENCES

Shuron Technician (publication), volume XIII, No. 2, published by The Shuron Optical Co. Inc., Geneva, New York, New York. Rear cover (Summer 1947).